Aug. 30, 1966  F. T. HILLIARD  3,270,191

VEHICLE DOOR LIGHT DEVICE

Filed Dec. 16, 1963  2 Sheets-Sheet 1

INVENTOR
FLOYD T. HILLIARD
BY
Duck & Zarley
ATTORNEYS

Aug. 30, 1966  F. T. HILLIARD  3,270,191
VEHICLE DOOR LIGHT DEVICE
Filed Dec. 16, 1963  2 Sheets-Sheet 2
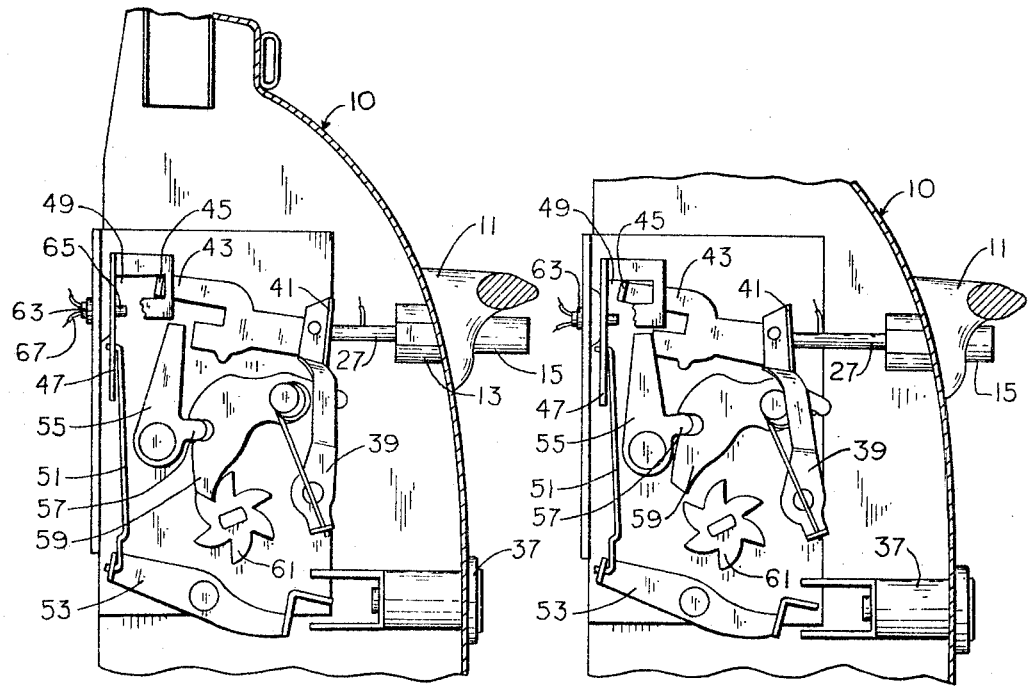
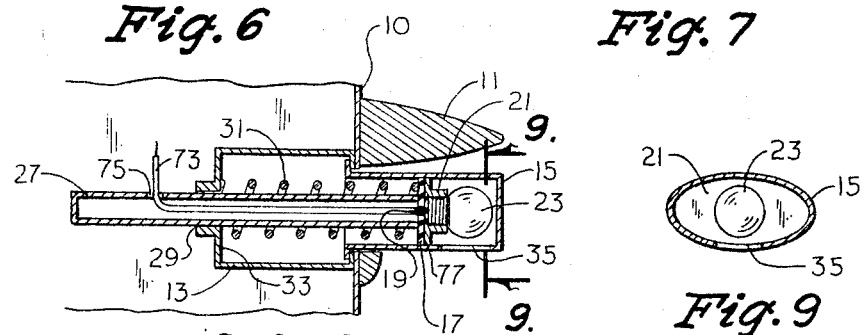
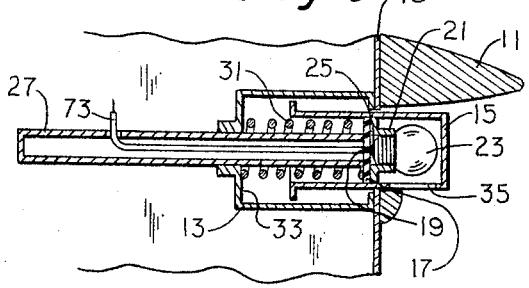
INVENTOR
FLOYD T. HILLIARD
BY
Duck & Zarley
ATTORNEYS

United States Patent Office 3,270,191
Patented August 30, 1966

3,270,191
VEHICLE DOOR LIGHT DEVICE
Floyd T. Hilliard, 1709 45th St., Des Moines, Iowa
Filed Dec. 16, 1963, Ser. No. 330,666
10 Claims. (Cl. 240—2.13)

Vehicle keyhole lights are well known in the art. However, it is significant to note that none of the major vehicle manufacturers have used a keyhole illuminator to date. The previous keyhole illuminators are undesirable for many reasons. The keyhole illuminators to date cannot be used with door handles on present day cars without changing the handle, changing the profile of the door, or adding a fixture to the vehicle. The keyhole illuminators to date required costly and extensive replacement of parts in the locking mechanism of the door. A further disadvantage of the prior inventions is that the illuminating devices were actviated each time the door was unlocked or opened which caused a serious drain on the battery.

Therefore, one of the principal objects of the invention is to provide a device which can be used with the handles on present day vehicles.

A further object of the invention is to provide a device which can be used without changing the profile of the door.

A further object of the invention is to provide a device which can be used without adding a fixture to the door of the vehicle.

A further object of the invention is to provide a device which can be used without costly and expensive replacement of parts in the existing linkage systems of the vehicle doors.

A further object of the invention is to provide a device which can be activated only when the vehicle door is locked.

A further object of the invention is to provide a device which permits a person to unlock a vehicle door without activating the illuminating means.

A further object of the invention is to provide a device which prevents unnecessary discharge of the battery of the vehicle.

A further object of the invention is to provide a device which will not be visible unless activated.

A further object of the invention is to provide a device which illuminates the keyhole area of a vehicle door.

A further object of the invention is to provide a device which illuminates an area adjacent the keyhole to permit a person to select the proper key for the unlocking of the door.

A still further object of the invention is to provide a device which will be durable in use, refined in appearance and economical of manufacture.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 6 is a side elevational view of the device when the door is in an unlocked position;

FIG. 7 is a side elevational view of the device illustrating the relative position of the parts when the push button is depressed and the door is in an unlocked position;

FIG. 8 is a sectional view of the device as seen on line 8—8 of FIG. 4 when the push button is in an outward position, at an enlarged scale;

FIG. 9 is a sectional view of the device as seen on line 9—9 of FIG. 8; and

FIG. 10 is a sectional view of the device as seen on line 8—8 of FIG. 4 when the push button is in an inward position, at an enlarged scale.

Figure 1:
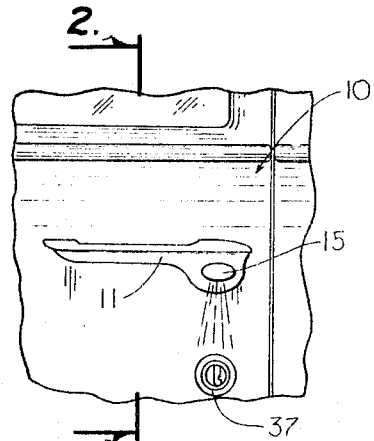
FIG. 1 is a fragmentary side view of the device illustrating illumination of a keyhole.

The numeral 10 generally designates a vehicle door. While the drawings show a passenger door the device would work equally well on a trunk door or the like. A handle 11 is secured to the outside surface of door 10 to facilitate the opening thereof. Handle 11 has a housing 13 extending inwardly through door 10. A hollow push button 15 slidably extends within housing 13. A flat plate 17, comprised of a non-electric conductive material, is secured to the inner wall of push button 15 and at substantially a right angle thereto. Flat plate 17 has a terminal 19 extending transversely thereto. Secured to the outer end of flat plate 17 is a socket means 21 adapted to receive light bulb 23. The electrode 25 of bulb 23 engages the outer surface of terminal 19. Secured to the inner end of flat plate 17 is a hollow plunger shaft 27 having an open outer end. Plunger shaft 27 slidably extends through a hole 29 in the inner end of housing 13. A spring means 31 embraces that portion of plunger shaft 27 which extends within housing 11 and push button 15. The inner end of spring 31 engages the inside surface of rear wall 33 of housing 11. The outer end of spring 31 engages the inner end of flat plate 17. Spring 31 yieldably maintains push button 15 in an outward position as seen in FIG. 8.

Push button 15 has an aperture in the outer bottom side for the passage of light rays from light bulb 23 to the outer surface of lock 37. A first plunger member 39 has its lower end pivotally secured to the inside of door 10. Plunger member 39 has a flange 41 extending from its upper end at substantially a right angle to the plane of plunger 39 and capable of engaging shaft 27. Pivotally secured to the upper portion of plunger member 39 is a second plunger member 43 extending inwardly therefrom. The innermost portion of plunger member 43 has a flange 45 extending at substantially a right angle from the plane of plunger member 43. Pivotally secured to door 10 is a shift member 47 having a horizontal slot 49 therein capable of receiving flange 45. Shift member 47 is linked to lock 37 by means of arms 51 and 53. Shift member 47 is also linked to an inside lock lever (not shown). Pivotally secured to door 10 is a release member 55 capable of engaging plunger member 43. Release member 55 has a lip 57 extending from the lower portion thereof and engaging a rotary bolt release member 59 which is also pivotally secured to door 10. The lower end of rotary bolt release member engages rotary bolt 61.

A normally open electrical switch 63 is secured to door 10 and has a plunger 65 in the movable path of flange 45 of the second plunger member 43 when door 10 is locked. A first electrical wire 67 extends from electrical switch 63 to a source of electrical energy such as battery 69 which is grounded at 71. A second electrical wire 73 extends from electrical switch 63 through hole 75 in plunger shaft 27, thence outwardly through the inside of plunger shaft 27 and is operatively connected to terminal 19 in flat plate 17. Light bulb 23 is grounded by means of contact with socket means 21 which in turn contacts push button 15 at 77.

The normal method of operation is as follows: Door 10 is in an unlocked position as illustrated in FIG. 6.

When push button 15 is depressed, plunger shaft 27 will engage flange 41 of plunger member 39. A second plunger member 43 will be thereby moved inwardly and will not engage plunger 65 of electrical switch 63. This is the result of shift member 47 being in a raised position which causes flange 45, engaged in horizontal slot 49, to be also moved upwardly thereby pivoting plunger member 43.

Figure 2:
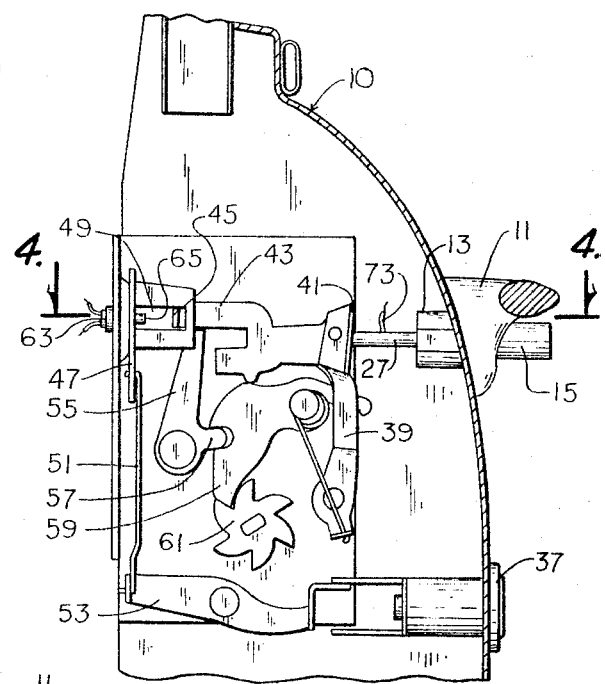
FIG. 2 is a sectional view as seen on line 2—2 of FIG. 1 at an enlarged scale.
Figure 3:
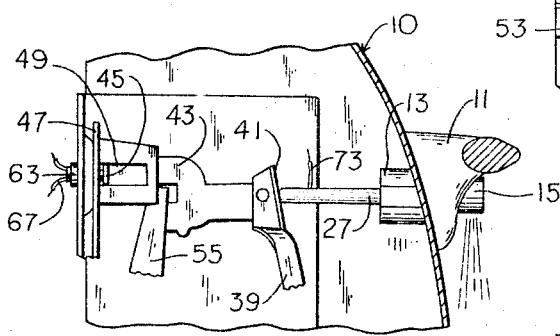
FIG. 3 is a fragmentary side elevational view of the device when activated.
Figure 4:
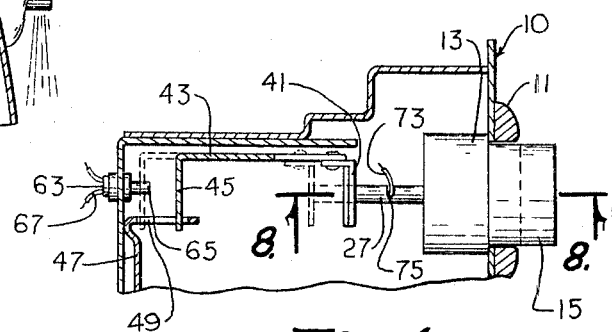
FIG. 4 is a sectional view of the device as seen on line 4—4 of FIG. 2.

When door 10 is in a locked position, as illustrated in FIG. 2, shift member 47 will be in a downward position. The downward position of shift member 47 necessarily causes the inner end of plunger member 43 to be in a lowered position. Push button 15 is depressed if so desired thereby causing plunger shaft 27 to engage flange 41 and move flange 41 inwardly. The inward movement of flange 41 causes plunger member 43 to be moved inwardly also until flange 45 depresses plunger 65 of electrical switch 63. Although push button 15 is in an inward position door 10 will not become unlocked until lock 37 is turned.

Plunger 15 being depressed closes the electrical circuit and light bulb 23 will be activated thereby transmitting light rays through aperture 35 towards the outer surface of lock 37. Bulb 23 not only illuminates the outer surface of lock 37 but the surrounding area as well, thereby enabling a person to select the proper key and its insertion into lock 37.

Figure 5:
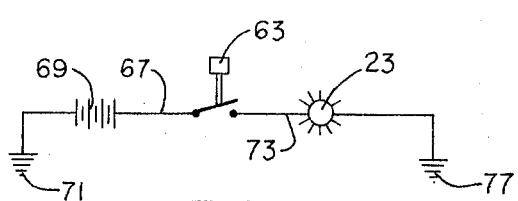
FIG. 5 is a schematic drawing of the electrical system of the device.

The unique feature of applicant's device which permits the door 10 to be unlocked or opened without activating light bulb 23 is most important. Such a device prevents unnecessary drain on the battery. It can be seen from FIGS. 2 and 8 that costly replacement of parts is not necessary when installing applicant's device in existing doors and door handles. It is simply necessary to install the bulb 23 within push button 15; cut an aperture in push button 15; replace the existing plunger shaft 27 with a shaft which is hollow; install a plunger-type electrical switch and wire the device as illustrated in FIG. 5 and as previously described.

Thus it can be seen that the device will accomplish at least all of its stated objectives.

Some changes may be made in the construction and arrangement of my vehicle door light device without departing from the real spirit and purpose of my invention, and it is my intention to cover by my claims, any modified forms of structure or use of mechanical equivalents which may be reasonably included within their scope.

I claim:

1. In a vehicle door light device, comprising in combination,
   a vehicle door,
   a handle secured to the outside surface of said door,
   a push button slidably extending inwardly through said handle for opening said door,
   said push button having an aperture in its outer bottom side,
   a light bulb in said push button,
   a normally open electrical switch secured to said door,
   an electrical wire extending from said electrical switch to said light bulb,
   said electrical switch operatively connected to a source of electrical energy,
   and locking means on said door, said locking means including a linkage means movable between locked and unlocked positions,
   said linkage means adapted to engage and close said electrical switch when said door and said linkage means are in their locked positions and said push button is in an inwardly extending position thereby activating said light bulb,
   said linkage means being inoperative to close said electrical switch when said door and said linkage means are in their unlocked positions.

2. In a vehicle door light device, comprising in combination,
   a vehicle door,
   a handle secured to the outside surface of said door,
   a push button slidably extending inwardly through said handle for opening said door,
   said push button having an aperture in its outer bottom side,
   a light bulb in said push button,
   a hollow plunger shaft secured to the inner end of said push button,
   a normally open electrical switch secured to said door,
   an electrical wire in said hollow plunger shaft and operatively connected at one end to said light bulb and its other end connected to said electrical switch,
   said electrical switch operatively connected to a source of electrical energy,
   and locking means on said door, said locking means including a linkage means movable between locked and unlocked positions,
   said linkage means adapted to engage and close said electrical switch when said door and said linkage means are in their locked positions and said push button is in an inwardly extending position thereby activating said light bulb,
   said linkage means being inoperative to close said electrical switch when said door and said linkage means are in their unlocked positions,
   said hollow plunger shaft engaging and moving said linkage means to close said electrical switch when said push button is in an inwardly extending position.

3. In a vehicle door light device, comprising in combination,
   a vehicle door,
   a handle secured to the outside surface of said door,
   a push button slidably extending inwardly through said handle for opening said door,
   said push button having an aperture in its outer bottom side,
   a light bulb in said push button,
   a hollow plunger shaft secured to the inner end of said push button,
   a normally open electrical switch secured to said door,
   an electrical wire in said hollow plunger shaft and operatively connected at one end to said light bulb and its other end connected to said electrical switch,
   said electrical switch operatively connected to a source of electrical energy,
   and locking means on said door, said locking means including a linkage means movable between locked and unlocked positions,
   said linkage means adapted to engage and close said electrical switch when said door and said linkage means are in their locked positions and said push button is in an inwardly extending position thereby activating said light bulb,
   said linkage means being inoperative to close said electrical switch when said door and said linkage means are in their unlocked positions.

4. In a vehicle door light device, comprising in combination,
   a vehicle door,
   a handle secured to the outside surface of said door,
   a push button slidably extending inwardly through said handle for opening said door,
   said push button having an aperture in its outer bottom side,
   a light bulb in said push button,
   a hollow plunger shaft secured to the inner end of said push button,
   a normally open electrical switch secured to said door,
   an electrical wire in said hollow plunger shaft and operatively connected at one end to said light bulb and its other end connected to said electrical switch,
   said electrical switch operatively connected to a source of electrical energy,
   and a locking means on said door, said locking means including a first plunger arm member pivotally secured to said door and a second plunger arm member pivotally secured to said first plunger arm member, said first and second plunger arm members being movable between locked and unlocked positions, said second plunger arm member engaging and closing said electrical switch when said door is in a locked position and said push button is in an inwardly extending position thereby activating said light bulb.

5. In a vehicle door light device, comprising in combination, a vehicle door, a handle secured to the outside surface of said door, a housing in said handle, a hollow push button slidably extending inwardly through said housing, a keyhole in said door, an electrical switch secured to said door, a socket means secured to the inside of said push button, a light bulb in said socket means, said push button having an aperture in its outer bottom side for the passage of light rays from said light bulb to said keyhole, a hollow plunger shaft slidably extending through said housing and having its outer end connected to said push button, a spring means in said housing for yieldably maintaining said push button in an outward extending position, an electrical wire in said plunger shaft having one end operatively connected to said socket means, said electrical wire having its other end operatively secured to said electrical switch, said electrical switch operatively connected to a source of electrical energy, and a locking means on said door, said locking means including a first plunger arm member pivotally secured to said door and a second plunger arm member pivotally secured to said first plunger arm member, said first and second plunger arm members being movable between locked and unlocked positions, said second plunger arm member engaging and closing said electrical switch when said door is in a locked position and said push button is in an inwardly extending position thereby activating said light bulb.

6. In a vehicle door light device, comprising in combination, a vehicle door, a handle secured to the outside surface of said door, a keyhole in said door below said handle, a push button slidably extending inwardly through said handle for opening said door, a light bulb in said push button, said push button having an aperture in its outer bottom side for the passage of light rays from said light bulb to said keyhole, a normally open electrical switch secured to said door, an electrical wire extending from said electrical switch to said light bulb, said electrical switch operatively connected to a source of electrical energy, and locking means on said door, said locking means including a linkage means movable between locked and unlocked positions, said linkage means adapted to engage and close said electrical switch when said door and said linkage means are in their locked positions and said push button is in an inwardly extending position thereby activating said light bulb, said linkage means being inoperative to close said electrical switch when said door and said linkage means are in their unlocked positions.

7. In a vehicle door light device, comprising in combination, a vehicle door, a handle secured to the outside surface of said door, a keyhole in said door below said handle, a push button slidably extending inwardly through said handle for opening said door, a light bulb in said push button, said push button having an aperture in its outer bottom side for the passage of light rays from said light bulb to said keyhole, a hollow plunger shaft secured to the inner end of said push button, a normally open electrical switch secured to said door, an electrical wire in said hollow plunger shaft and operatively connected at one end to said light bulb and its other end connected to said electrical switch, said electrical switch operatively connected to a source of electrical energy, and locking means on said door, said locking means including a linkage means movable between locked and unlocked positions, said linkage means adapted to engage and close said electrical switch when said door and said linkage means are in their locked positions and said push button is in an inwardly extending position thereby activating said light bulb, said linkage means being inoperative to close said electrical switch when said door and said linkage means are in their unlocked positions.

8. In a vehicle door light device, comprising in combination, a vehicle door, a handle secured to the outside surface of said door, a keyhole in said door below said handle, a push button slidably extending inwardly through said handle for opening said door, a light bulb in said push button, said push button having an aperture in its outer bottom side for the passage of light rays from said light bulb to said keyhole, and a locking means on said door, and locking means on said door, said locking means including a linkage means movable between locked and unlocked positions, said linkage means adapted to engage and close said electrical switch when said door and said linkage means are in their locked positions and said push button is in an inwardly extending position thereby activating said light bulb, said linkage means being inoperative to close said electrical switch when said door and said linkage means are in their unlocked positions.

9. In a vehicle door light device, comprising in combination, a vehicle door, a handle secured to the outside surface of said door, a keyhole in said door below said handle, a push button slidably extending inwardly through said handle for opening said door, a light bulb in said push button, said push button having an aperture in its outer bottom side for the passage of light rays from said light bulb to said keyhole, and a locking means on said door, said locking means including a first plunger arm member pivotally secured to said door and a second plunger arm member pivotally secured to said first plunger arm member, said first and second plunger arm members being movable between locked and unlocked positions, said second plunger arm member engaging and closing an electrical switch when said door is in a locked position and said push button is in an inwardly extending position thereby activating said light bulb.

10. In a vehicle door light device, comprising in combination, a vehicle door, a handle secured to the outside surface of said door, a keyhole in said door below said handle,
a housing in said handle,
a hollow push button slidably extending inwardly through said housing,
an electrical switch secured to said door,
a flat plate secured to the inner walls of said push button and at substantially a right angle thereto,
a socket means secured to the outer end of said flat plate,
said flat plate having a terminal therein extending transversely thereto and operatively connected to said socket means,
a light bulb threadably inserted in said socket means,
said push button having an aperture in its outer bottom side for the passage of light rays from said light bulb to said keyhole,
a hollow plunger shaft slidably extending through said housing and having its outer end secured to said flat plate,
a spring means in said housing for yieldably maintaining said push button in an outward extending position,
an electrical wire in said plunger shaft operatively connected to said terminal,
said electrical wire having its other end operatively secured to said electrical switch,
said electrical switch operatively connected to a source of electrical energy,
and a locking means on said door,
said locking means including a first plunger arm member pivotally secured to said door and a second plunger arm member pivotally secured to said first plunger arm member,
said first and second plunger arm members being movable between locked and unlocked positions,
said second plunger arm member engaging and closing said electrical switch when said door is in a locked position and said push button is in an inwardly extending position thereby activating said light bulb.

References Cited by the Examiner
UNITED STATES PATENTS

| | | | |
|---|---|---|---|
| 2,273,570 | 2/1942 | Greenlees | 240—2.13 |
| 2,283,444 | 5/1942 | Koehler | 240—2.13 |
| 3,162,374 | 11/1964 | Skokut | 240—2.13 |

NORTON ANSHER, *Primary Examiner.*

C. CHALMERS LOGAN, II, *Assistant Examiner.*